United States Patent [19]

Shirota et al.

[11] Patent Number: 4,864,324

[45] Date of Patent: Sep. 5, 1989

[54] COLOR IMAGE FORMING METHOD AND INK USED THEREFOR

[75] Inventors: Katsuhiro Shirota, Hiratsuka; Tsuyoshi Eida, Yokohama; Yuko Suga, Tokyo, all of Japan

[73] Assignee: Canon Kabushiki Kaisha, Tokyo, Japan

[21] Appl. No.: 84,079

[22] Filed: Aug. 11, 1987

[30] Foreign Application Priority Data

Aug. 13, 1986 [JP] Japan .................................. 61-188578
Sep. 17, 1986 [JP] Japan .................................. 61-217266
Sep. 17, 1986 [JP] Japan .................................. 61-217227

[51] Int. Cl.$^4$ ............................................... G01D 9/00
[52] U.S. Cl. ........................................ 346/1.1; 106/20; 106/22; 346/75
[58] Field of Search ............... 106/22, 20, 308 Q; 346/1.1, 75

[56] References Cited

U.S. PATENT DOCUMENTS

| | | | |
|---|---|---|---|
| 3,889,271 | 6/1975 | Freytag et al. .................... | 106/22 |
| 3,909,259 | 9/1975 | Mammino et al. .................... | 430/45 |
| 4,066,563 | 1/1978 | Mammino et al. .................... | 430/108 |
| 4,147,540 | 4/1979 | Mammino et al. .................... | 430/45 |
| 4,324,851 | 4/1982 | Lu et al. .............................. | 430/106 |
| 4,347,173 | 8/1982 | Merian et al. ....................... | 428/379 |
| 4,663,642 | 5/1987 | Kameda .............................. | 346/217 |

*Primary Examiner*—Amelia Burgess
*Attorney, Agent, or Firm*—Fitzpatrick, Cella, Harper & Scinto

[57] ABSTRACT

There is disclosed a method for forming a color image by use of a plurality of color inks containing a cyan ink, wherein there is used an ink as the cyan ink which contains a metallophthalocyanine dye and/or a metal-free phthalocyanine dye and which contains free ions of divalent or higher metals at the concentration of 15 ppm or less, the metallophthalocyanine dye having a coordination metal selected from the metal atoms of the groups, IIA, IVB, VA, VIIA and VIII of the periodic Table of The Elements at the center of its skeleton, and the metal-free phthalocyanine dye having no coordination metal at the center of its skeleton, and also an ink to be used therefor.

39 Claims, No Drawings

COLOR IMAGE FORMING METHOD AND INK USED THEREFOR

BACKGROUND OF THE INVENTION

1. Field of the Invention

This invention relates to a method for forming a color image and an ink to be used therefor, particularly to a method for forming, color images with extremely good lightfastness even when a mixed color portion is formed by overlapping inks of different colors on a recording medium, and according to which color images can also be obtained stably for a long time without any trouble such as clogging in an ink flow path such as a nozzle, etc., even in an ink jet system printer using heat energy, and an ink to be used therefor.

2. Related Background Art

In an ink jet system, recording is performed by forming ink droplets according to various ink ejecting systems, and then attaching some or all of them onto a recording medium such as paper, etc. As the ink used for forming color images according to such ink jet system, there may be employed an ink prepared by dissolving or dispersing water-soluble dyes of various hues, such as cyan, magenta, yellow, black, etc., in water or a liquid medium comprising water and a water-soluble solvent, and color images are formed using at least two inks with different hues.

Also, as the ink used for forming color images by use of writing implements such as a fountain pen, a felt tipped pen, ball point pen, etc., plural inks with different hues as described above have been used.

In the ink of the prior art as mentioned above, various performance characteristics are demanded as a matter of course, and among which the most frequently demanded characteristics concerns the lightfastness of the color images.

To elaborate on about this point, in an ink containing a dye, if the lightfastness of such dye is insufficient, there occurs frequently the problem that after image formation, the image will discolor or fade with time, whereby image quality is lowered.

Particularly, in the case of a color image, as the result of formation of the color image by superposition of different dyes of several kinds having hues on the paper, although individual dyes may exhibit excellent lightfastness, there ensues a new problem that lightfastness of the color image as a whole may be remarkably lowered by an interaction between the dyes.

For example, a copper phthalocyanine dye widely used as the dye for cyan ink in the ink jet system or a phthalocyanine dye as described in Japanese Laid-open patent publication No. 179569/1984 exhibits itself excellent lightfastness, but generally promotes fading of other dyes when superposed on such dyes on paper as described above; in particular it exercises remarkable influences on magenta dyes most and black dyes, particularly monoazo type magenta dyes. Accordingly, such problems must be solved very promptly in the present situation where the ink jet method for forming color images is attracting attention due to its advantages in handiness, cost, etc.

In formation of color images as described above, another important problem is liquid stability that the ink of any hue is free from clogging or generation of sediment matter at a nozzle, an orifice or a pen tip, during recording by use of the ink according to various systems, during intermission of recording and during periods of no recording for a long term.

Particularly among the ink jet systems, in the system employing heat energy, foreign matters are liable to be deposited on the surface of a thermal head due to temperature change, and therefore this problem is particularly important. Particularly, since plural inks are used when color images are formed, all of the inks are required to have sufficient liquid stability.

However, in the case of the inks of the prior art, some additives are required to be used for satisfying various conditions such as ejecting condition of ink, storage stability for a long term, sharpness and density of images in recording, surface tension, electrical properties, etc., and also due to various impurities contained in the dyes used, there have been various problems such that clogging occurred at a nozzle or an orifice of an ink jet device or deposited matter was generated on the surface of the heating head, or sediment matter was generated during storage for a long term. Thus, in spite of various excellent characteristics of the ink jet system, this is one reason why it has not attained widespread popularity.

SUMMARY OF THE INVENTION

Accordingly, a principal object of the present invention is to provide a novel color image forming method which has overcome the drawbacks as described above, and an ink to be used therefor.

That is, an object of the present invention is to provide a method for forming color images which are extremely lightfast at the mixed color portion formed by overlapping ink droplets having different colors on a recording medium, and an ink to be used therefor.

Further, it is another object of the present invention to provide a method of forming color images stably for a long time without problems such as clogging, etc. in an ink flow path, and an ink to be used therefor.

According to one aspect of the present invention, there is provided a method for forming a color image by use of a plurality of color inks containing a cyan ink, wherein there is used as the cyan ink which contains a metallophthalocyanine dye and/or a metal-free phthalocyanine dye and which contains free ions of divalent or higher metals at the concentration of 15 ppm or less, the metallophthalocyanine dye having a coordination metal selected from the metal atoms of the groups IIA, IVB, VA, VIIA and VIII of the periodic Table of The Elements at the center of its skeleton, and the metal-free phthalocyanine dye having no coordination metal at the center of its skeleton.

According to another aspect, the present invention provides an ink comprising a dye and a liquid medium for dissolving or dispersing the dye therein, wherein said dye is a metallophthalocyanine dye and/or a metal-free phthalocyanine dye and which contains free ions of divalent or higher metals at the concentration of 15 ppm or less, the metallophthalocyanine dye having a coordination metal selected from the metal atoms of the groups IIA, IVB, VA, VIIA and VIII of the periodic Table of The Elements at the center of its skeleton, and the metal-free phthalocyanine dye having no coordination metal at the center of its skeleton.

According to still another aspect, the present invention provides a method for forming a color image by use of a plurality of color inks containing a cyan ink, wherein at least one of the color inks contains a UV-ray absorber and the cyan ink contains a metallophthalocyanine dye and/or a metal-free phthalocyanine dye and which contains free ions of divalent or higher metals at the concentration of 15 ppm or less, the metallophthalocyanine dye having a coordination metal selected from the metal atoms of the groups IIA, IVB, VA, VIIA and VIII of the periodic Table of The Elements at the center of its skeleton, and the metal-free phthalocyanine dye having no coordination metal at the center of its skeleton.

According to a further aspect of the present invention, there is also provided a method for forming a color image by use of a plurality of color inks containing a cyan ink, wherein the color image is coated with a transparent protective member containing at least a UV-ray absorber and there is used an ink as the cyan ink which contains a metallophthalocyanine dye and/or a metal-free phthalocyanine dye and which contains free ions of divalent or higher metals at the concentration of 15 ppm or less, the metallophthalocyanine dye having a coordination metal selected from the metal atoms of the groups II, IV, VII and VIII at the center of its skeleton, and the metal-free phthalocyanine dye having no coordination metal at the center of its skeleton.

DETAILED DESCRIPTION OF THE PREFERRED EMBODIMENTS

The present inventors have done intensive research in order to accomplish the objectives as described above and consequently found that by using a specific phthalocyanine dye as the dye for cyan ink and by defining the amount of divalent or higher metal ions in the ink, the fading prevention effect of other hues to which the cyan ink is imparted overlappingly, particularly magenta and/or black dyes, can be obtained, thus giving color images with excellent lightfastness.

Also, concerning the problem of liquid stability of ink, it has been found that many impurities are contained in commercially available dyes, and that if they are utilized as such for preparation of ink, these impurities, particularly divalent or higher metal ions, mainly cause the problems of clogging of a nozzle and lowering of ink stability as described above.

A commercially available cyan dye, as it is, contains a large amount of unreacted free metal ions entrained during its synthesis. Accordingly, when such commercially available cyan dye is used for an ink in the present invention, these free metal ions or their compounds cause, e.g., clogging of a nozzle or an orifice and formation of sediment during the storage of in the ink.

Particularly, this is the greatest cause for deposition of foreign matters on the heating head in an ink jet system utilizing heat energy. Thus, it has been found that a cyan ink with high liquid stability can be obtained by suppressing such impurities at a certain value or less, and consequently a color image with excellent lightfastness can be stably formed.

Next, to describe in more detail about the present invention, the principal specific feature of the present invention is to use a phthalocyanine dye having a coordination metal of the group IIA, IVB, VA, VIIA and VIII of the periodic Table of The Elements or a metal-free phthalocyanine dye as the dye for cyan ink in formation of a color image by use of ink, and to obtain a color image with excellent lightfastness by use of such cyan ink.

In the prior art, it has been known to use a copper phthalocyanine dye as the cyan dye in formation of a color image by use of a plurality of inks with different hues, for example, the three primary colors of cyan, magenta and yellow or the four primary colors containing black in addition to the three colors. While such copper phthalocyanine dye itself shows high lightfastness, the problem has issued that lightfastness of dyes of other hues, for example, magenta dye or black dye is remarkably lowered by using such copper phthalocyanine dye. By use of the phthalocyanine dye as mentioned above in place of the copper phthalocyanine dye, the color image having excellent lightfastness as a whole can be provided without lowering in lightfastness of dyes of other hues as described above.

The phthalocyanine dye to be used in the present invention is represented by the following formula (I):

In the above formula, [ph] represents a phthalocyanine skeleton having a coordination metal atom of the group IIA, IVB, VA, VIIA and VIII of the periodic Table of The Elements or no coordination metal atom at its center; Q represents any desired substituent; a is an integer of 0 to 4; X represents an alkali metal or $NH_4$; and b represents an integer of 1 to 4.

The phthalocyanine dye to be used in the present invention may be any phthalocyanine dye, provided that it is included within the above formula. The phthalocyanine dye which can give still better color images in respect of tone, lightfastness, water resistance, relationship with dyes of other hues, liquid stability of the ink formed, and other various performances is represented by the above formula, wherein Q represents a $-SO_2OR_1$ group or a $-SO_2NR_2R_3$ group; a and b independently represent an integer of 0 to 4, provided that the relationship of $2 \leq a+b \leq 4$ is satisfied; the above $R_1$ represents a straight or cyclic alkyl or aralkyl group which may also have abranching; $R_2$ and $R_3$ independently represent a $-(CH_2CH_2O)_n-R_4$, $-(CH_2CHOH)_n-R_4$, or $-(CHCH_3CH_2O)_n-R_4$ group, a straight or cyclic alkyl or aralkyl group which may also have a branch, or an amino acid salt residue; n represents an integer of 0 to 12; and $R_4$ represents H, $CH_3$ or $CH_2OH$.

The above preferable phthalocyanine dye may be any dye, provided that it is included within the above definition. Specific examples thereof include those as mentioned below. Among these phthalocyanine dyes, particularly preferable are those with their center metal being Ni, Co, V, particularly Ni. In the following formulae, ph represents the phthalocyanine skeleton, and the respective substituents Q and sulfonic acid salt residue are bound to the benzene ring of phthalocyanine.

```
1-1  a = 1, Q = SO2NH2
     b = 1, X = Na
     center metal = Ni
1-2  a = 0,
     b = 2, X = Na
     center metal = Ni
1-3  a = 0,
     b = 3, X = Na
     center metal = Ni
1-4  a = 1, Q = SO2NH2
     b = 3, X = Na
     center metal = Ni
1-5  a = 2, Q = SO2NH2
     b = 2, X = Na
     center metal = Ni
```

-continued 1-6   a = 3, Q = SO$_2$NH$_2$
     b = 1, X = Na
     center metal = Ni
1-7   a = 2, Q = SO$_2$NH(CH$_2$)$_3$CH$_3$
     b = 1, X = Na
     center metal = Ni
1-8   a = 2, Q = SO$_2$NHC$_2$H$_5$
     b = 2, X = K
     center metal = Ni
1-9   a = 2, Q = SO$_2$NH(CH$_2$CH$_2$O)$_2$CH$_3$
     b = 1, X = K
     center metal = Ni
1-10   a = 2, Q = SO$_2$NHCH$_2$CH$_3$
     b = 1, X = Li
     center metal = Ni
1-11   a = 3, Q = SO$_2$OC$_2$H$_5$
     b = 1, X = Na
     center metal = Co
1-12   a = 2, Q = SO$_2$OCH(CH$_3$)$_2$
     b = 1, X = Na
     center metal = Co
1-13   a = 1, Q = SO$_2$NH$_2$
     b = 2, X = Na
     center metal = Co
1-14   a = 1, Q = SO$_2$O(CH$_2$)$_3$CH$_3$
     b = 3, X = K
     center metal = V
1-15   a = 1, Q = SO$_2$NH$_2$
     b = 2, X = Na
     center metal = V
1-16   a = 1, Q = SO$_2$(CH$_2$)$_2$CH$_3$
     b = 2, X = Na
     center metal = V The phthalocyanine dyes as described above are commercially available with ease, and any of such commercially available phthalocyaine dyes can be used in the present invention. These cyan dyes can be used of course alone or as a combination of two or more kinds thereof, or can be used as the essential component in combination with other various dyes such as direct dyes, acidic dyes, etc. These commercially available phthalocyanine dyes are produced primarily for dyeing of fibers, therefore containing much impurities.

The present inventors have studied also about these impurities and found that a considerable amount of divalent or higher free metal ions (e.g. tens to several hundreds ppm) are contained together with many inorganic salts, and these metal ions cause many problems during formation of color image, particularly during a color formation according to the ink jet system. That is, it has been found that when these metal ions are in the cyan ink, and when the cyan ink is overlapped with inks of other hues, particularly a magenta and/or a black ink during formation of a color image, then it will promote lightfastness deterioration of the dyes in these other hues.

Also, it has been found that these metal ions deposit foreign matter on the thermal head of the ink jet device, particularly when the ink jet system utilizes heat energy, thereby preventing smooth ejection of ink and formation of a satisfactory color images.

Fading of magenta and black dyes with metal ions in color images and deposition of foreign matters on the thermal head as described above depend greatly on the concentration of metal ions in the ink, and these problems can be sufficiently solved by controlling the free metal ions in the ink to 15 ppm or less, preferably 3 ppm or less.

The method of controlling the concentration of the metal ions in the ink to 15 ppm or less may be the method in which the phthalocyanine dye before the preparation of the ink is or the method in which the ink is purified or after the preparation of the ink. As the method for the purification of dye or ink, there may be employed any of the methods known in the art such as the salting out method, washing with an organic solvent, precipitation, recrystallization, the ion exchange method, the aeration method, the agglomeration precipitation method with an agglomeration agent, the filtration method, the lime softening method, the electrolytic method or a combination of these methods.

In the method for forming a color image of the present invention, there is used the cyan ink containing the phthalocyanine dye as described above and also inks of hues other than cyan, and the effect of the present invention can be most exhibited when the ink used in combination is magenta and/or a black dye. To describe in detail, in the prior art, when a phthalocyanine type dye which is itself excellent in lightfastness is used as the cyan dye, fading of much magenta and black dyes was promoted. However, in the present invention, magenta and black dyes having other excellent performances which could not be used due to promotion of such fading in the prior art can be satisfactorily used, whereby further excellent color image can be formed.

For example, as the magenta dye, xanthene type dyes such as C.I. Acid Red 50, 51, 52, 87, 91, 92, 93, 94, 95, 98, etc. and anthraquinone type dyes such as C.I. Acid Red 80, 81, 82, 83, etc. can be preferably used not depending on their structures, and those which can preferably bring about the effects of the present invention are monoazo dyes represented by the following formula:

$$Q_1-N=N-Q_2$$

wherein $Q_1$ represents a substituted or unsubstituted phenyl or naphthyl group and $Q_2$ represents a substituted naphthyl group.

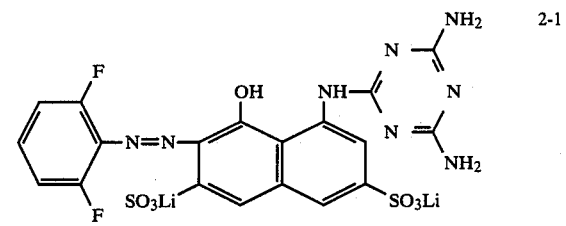

2-1

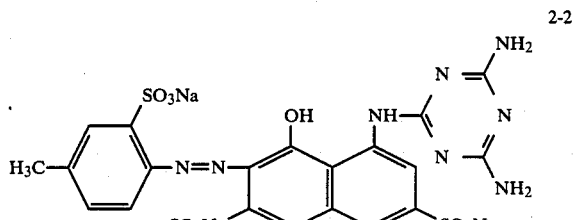

2-2

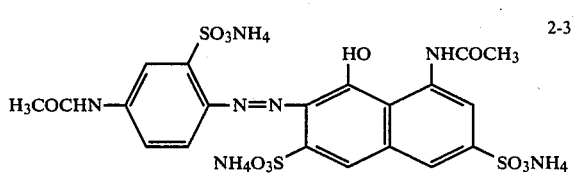

2-3

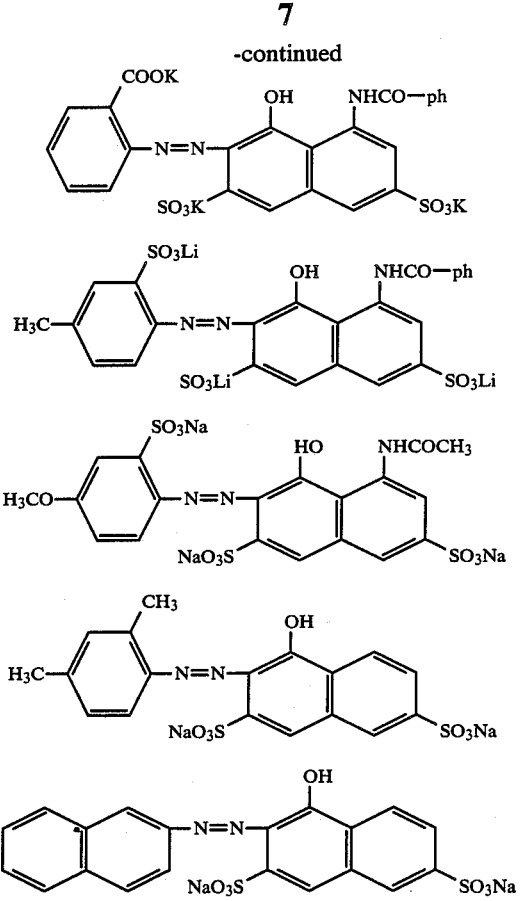

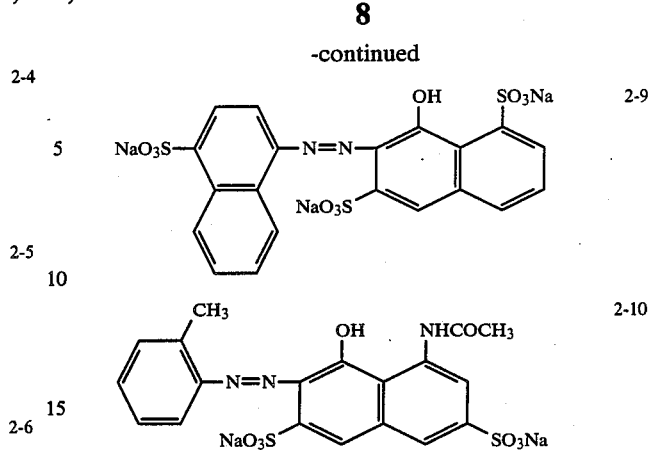

The black dye to be used in the present invention may be any black dye known in the art. The black dyes which well can bring about the effects of the present invention is represented by the following general formula:

$$Q_3-N=N-Q_4-N=N-Q_5$$

wherein $Q_3$ represents a substituted phenyl or naphthyl group, $Q_4$ represents a substituted phenylene or naphthylene group and $Q_5$ represents a substituted naphthyl group.

Examples of the black dyes include those represented by the following formulae.

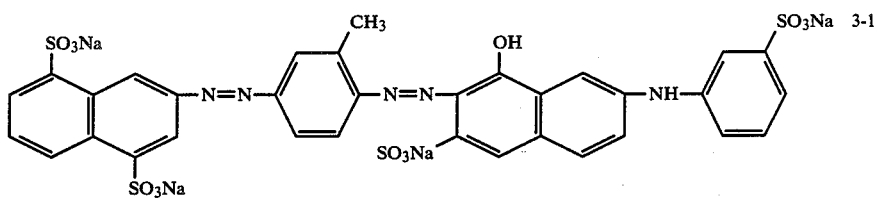

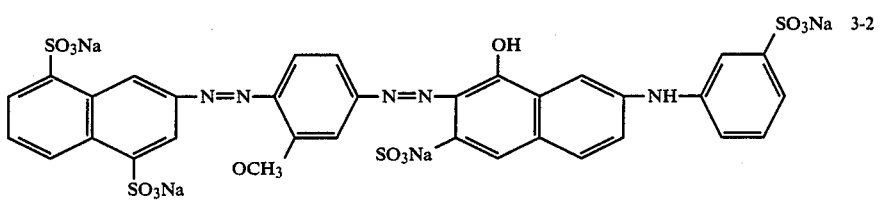

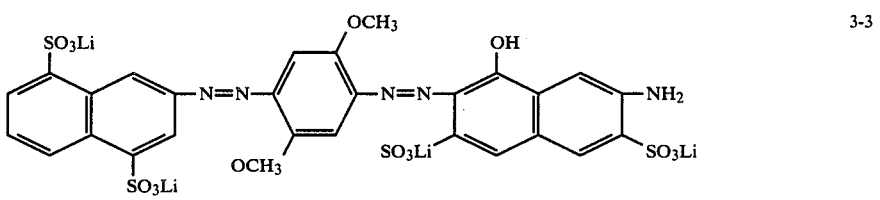

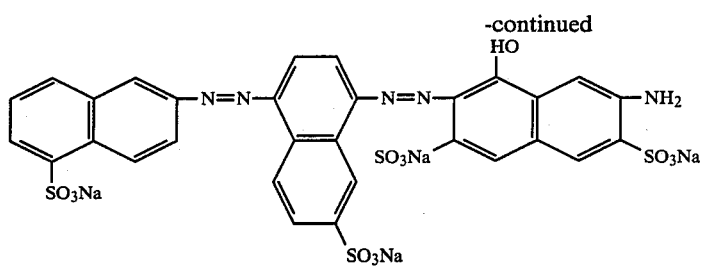

3-4

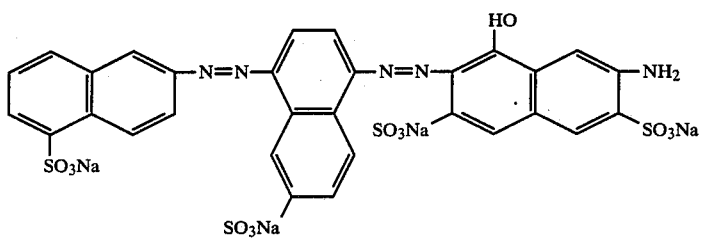

3-5

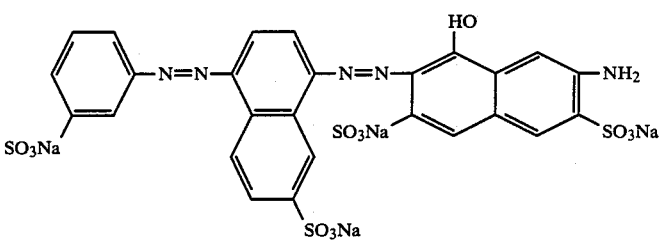

3-6

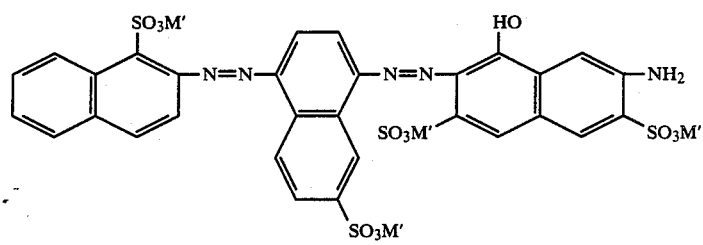

3-7

M': $^{\oplus}NH(C_2H_4OH)_3$

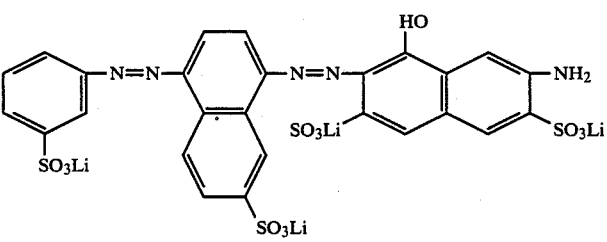

3-8

Also, in the present invention, other than magenta and/or black inks as described above, yellow inks can be used, and all of the yellow inks used in the ink jet system, etc. can be used without any limitation for the ink to be used in these yellow inks.

In the method of the present invention, other than the cyan ink prepared from the phthalocyanine dye as described above, ink of at least one color other than cyan is used in combination. The ink to be used in combination may be prepared from any dye, but concerning magenta color and black color, the respective dyes as mentioned above are preferred, and concerning yellow dye, any yellow dye may be employed. The method itself for the preparation of these aqueous inks of these respective colors may be practiced according to the prior art technique.

As described above, by use of the above ink as the cyan ink in formation of color images, lightfastness of the image can be remarkably improved. In addition, for exhibiting its effect fully, it is preferable to incorporate a UV-ray absorber in at least one ink of the plural inks to be used.

As the UV-ray absorber to be used in the present invention, there have been known in the art those which prevent material from deterioration by UV-ray by absorbing primarily the rays at UV-wavelength portion in the sunlight to convert them, into, e.g., heat energy, and which have been utilized widely in the field of synthetic resins and foods of the prior art. All of these known UV-ray absorbers can be used in the present invention, and they may not be necessarily water-soluble. They may be also insoluble in ink medium if they can be stably dispersed in ink medium. However, particularly preferable ones in the present invention are soluble in ink medium, namely water or water and a hydrophilic solvent, including a benzophenone type, a benzotriazole type, a cyanoacrylate type, and a salicylic acid type UV-ray absorber which have hydrophilic group such as sulfonic acid group, a carboxylic acid group, a phenolic hydroxyl group, an amino group or a soluble salt thereof and derivatives thereof. More specifically, there may be included 2,2'-dihydroxy-4,4'-dimethoxybenzophenone-5-sulfonic acid, salts thereof with sodium, potassium, lithium, etc.; 2-hydroxy-4-methoxybenzophenone-5-sulfonic acid and salts thereof with sodium, potassium, lithium, etc.; (2'L -hydroxy-5'-methylphenyl)benzotriazole; (2'-hydroxy-phenyl)benzotriazole; and the like.

These UV-ray absorbers may be added to at least one of plural inks with different hues for forming color image in the present invention to accomplish the objects of the present invention. However, since the color image is not necessarily prepared by overlapping used ink droplets with each other and there may also exist the region of only one color or only two overlapping colors, it is practically preferable that at least the three primary colors of the inks used should contain UV-ray absorber.

The amount of the UV-ray absorber in the ink may be preferably in the range from 0.1 to 5 wt.%, more preferably from 0.5 to 3 wt.%, in the ink, since the effect of the present invention is insufficient if it is too small, while liquid stability, etc. of the ink may be impaired if it is too large.

As described above, by using an ink containing a UV-absorber, and also using the above specific cyan dye as the dye for cyan ink, lightfastness of the full color image can be remarkably improved.

The content of the above dye in the ink according to the present invention may be determined depending on the kind of the liquid medium component, the characteristics demanded for the ink and the like. It may be generally made within the range from 0.1 to 20% in weight %, preferably from 0.5 to 15%, more preferably from 1 to 10%, based on the total weight of ink.

The solvent suitably used in the present invention is water or a solvent mixture of water with a water-soluble organic solvent. Particularly suitable in a solvent mixture of water and a water-soluble organic solvent, and the water-soluble organic solvent may include those containing polyhydric alcohol having the drying prevention effect of ink. Also, as water, it is preferable to use deionized water rather than water in general containing various ions, particularly divalent or higher metal ions.

Examples of the water-soluble organic solvent to be used in mixture with water may include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc.; ketones or ketoalcohols such as acetone, diacetone alcohol, etc.; ethers such as tetrahydrofuran, dioxane, etc.; polyalkylene glycols such as polyethylene glyol, polypropylene glycol, etc.; alkylene glycols with alkylene group having 2 to 6 carbon atoms such as ethylene glycol, propylene glycol, butylene glycol, triethylene glycol, 1,2,6-hexanetriol, thiodiglycol, hexylene glycol, diethylene glycol, etc.; glycerine; lower alkyl ethers of polyhydric alcohols such as ethylene glycol methyl (or ethyl) ether, diethylene glycol methyl (or ethyl) ether, triethylene glycol monomethyl (or ethyl) ether, etc.; N-methyl-2-pyrrolidone, 1,3-dimethyl-2-imidazolidinone, etc. Among these many water-soluble organic solvents, polyhydric alcohols such as ethylene glycol, etc., lower alkyl ethers of polyhydric alcohols such as triethylene glycol monomethyl (or ether) ether, etc. are preferred.

The content of the above water-soluble organic solvent in the ink may be 5 to 95% by weight, preferably 10 to 80% by weight, more preferably 20 to 50% by weight, based on the total weight of ink. At this time, the content of water may be determined within a broad range depending on the kind of the above solvent component, its composition or the desired characteristics of ink. It is generally made within the range from 10 to 90%, preferably from 10 to 70%, more preferably from 20 to 70%, based on the total weight of ink.

The ink of the present invention comprising such components is itself excellent in all of recording characteristics (signal response characteristic, stability of droplet formation, ejecting stability, continuous recordability for long time, ejecting stability after stopping of recording for long time), storage stability, fixability onto recording medium or lightfastness, weathering resistance, water resistance of recorded images, etc.

For further improvement of such characteristics, various additives known in the prior art may be further added. For example, there may be included viscosity controllers such as polyvinyl alcohol, celluloses, water-soluble resins, etc.; surface tension controllers such as various cationic, anonic or nonionic surfactants, diethanolamine, triethanolamine, etc.; pH controllers by use of buffers; antifungal agent, etc.

Also, for preparing an ink to be used for the ink jet system of the type in which ink is charged, specific resistivity controllers of inorganic salts such as lithium chloride, ammonium chloride, sodium chloride, etc. may be added. Further, when such ink is applied to the ink jet system of the type in which ink is ejected by the action of heat energy, thermal physical properties (e.g. specific heat, thermal expansion coefficient, thermal conductivity, etc.) may be often controlled.

As described above, improvement of lightfastness in color image formation is effected by incorporating a UV-absorber in at least one of plural inks. As another means, there is the method in which UV-wavelength the color image is coated with a transparent protective member containing a UV-absorber after recording of images.

The transparent protective member (laminate) which can be used in the present invention is described in detail below.

The transparent protective member to be used in the present invention is a laminate material for treating the image surface of a color image (print) formed on paper, plastic sheet, etc. by ink jet recording, etc., and can readily impart water resistance, solvent resistance, abrasion resistance, gloss, etc. to the recorded image. Further, by incorporating a UV-ray absorber in the transparent protective member, lightfastness of the color image can be also improved to great extent.

Specific examples of the UV-ray absorber suitably used in the present invention may include benzophenone type compounds, for example, 2-hydroxy-4-methoxy-5-sulfobenzophenone such as Cyasorb UV-284 (trade name, produced by ACC Co.), 2,2'-dihydroxy-4,4'-dimethoxybenzophenone such as Uvinul D-49 (trade name, produced by BASF Co.), 2,4-dihydroxybenzophenon such as Uvinul 400 (trade name, produced by BASF Co.); benzotriazole type compounds, for example, 2-(2'-hydroxy-3',5-'di-tert-butyl-phenyl)triazole such as Tinuvin 320 (trade name, produced by Ciba Geigy Co.), 2-(2'-hydroxy-3'-tert-butyl-5'-methylphenyl)-5-chlorobenzotriazole such as Tinuvin 326 (trade name, produced by Ciba Geigy Co.), 2-(2'-hydroxy-3',5'-di-tert-butyl-phenyl)-5-chlorobenzotriazole such as Tinuvin 327 (trade name, produced by Ciba Geigy Co.), 2-(2'-hydroxy-3',5'-di-tert-amyl-phenyl)benzotriazole such as Tinuvin 328 (trade name, produced by Ciba Geigy Co.), 5-tert-butyl-3-(5-chloro-2H-benzotriazol-2-yl)-4-hydroxybenzopropionic acid octyl ester such as Tinuvin 109 (trade name, produced by Ciba Geigy Co.), etc.

Selection of the subtance having absorption at the UV-region as described above and determination of the concentration added may be suitably controlled depending on the solubility in the resin forming the transparent protective member, its thickness, etc.

As the resin component forming the transparent protective member containing a substance having absorption at UV-region, there may be included those mainly composed of thermoplastic resins such as ethyl cellulose, vinyl acetate resins and derivative thereof, polyethylene, ethylene-vinyl acetate copolymer, acrylic resin and derivatives thereof, polystyrene and copolymers thereof, polyisobutylene, hydrocarbon resin, polypropylene, polyamide resins, polyester resins, etc. Such transparent protective member can be used as a single layer or a multi-layer, and may be used as laminated generally on one surface of a color image, or in some cases on both surfaces thereof. The essential components of the above transparent protective member are as described above, but various kinds of resins, an additive known in the art such as plasticizers, lubricants, antioxidants, light stabilizers, antistatic agents, swelling agents, heat stabilizers, dyes, pigments, etc. can be added optionally to such an extent that does not impair its transparency.

The transparent protective member to be used in the present invention is formed of the essential or necessary components as described above, and its thickness can be set at a broad range, depending on its uses. For exhibiting effectively the effect of the present invention, its thickness may be most preferably within the range of from 5 to 50 μm. If the thickness exceeds 50 μm, there will ensue the problem of curl. In addition, and the problem of lowering in transparency by coloraton is liable to occur. On the other hand, if the thickness is less than 5 μm, it becomes difficult to incorporate a substance having sufficient absorption at the UV-region.

From the components and he constitution as described above, the transparent protective member to be used in the method of the present invention can be obtained. Such transparent protective member should preferably have an absorption distribution wherein the entire protective member laminated on the color image is preferably 1 or more throughout 300 to 350 nm and 0.1 or less throughout 400 to 800 nm. Such absorbance distribution can be controlled by selecting the UV-ray absorber and varying its concentration, combining with selected resins, adding various additives, and controlling layer thickness.

If the absorbance distribution of the transparent protective member does not become 1 or higher throughout 300 to 350 nm, the effect of preventing the reaction in which the dye forming the color image is decomposed by the UV-ray to fade or discolor, becomes insufficient. On the other hand, if the absorbance throughout of 400 to 800 nm is not 0.1 or lower, it is unsuitable as the transparent protective member due to coloration or lowering in transparency. The above values of absorbance were measured by U-3200 Model autographic spectrophotometer (produced by Hitachi Seisakusho).

The transparent protective member containing at least a UV-ray absorber as described above is suitable for formation of a protective layer for a color print having images formed on paper, plastic sheet, etc. according to the recording method particularly by use of dyes, above all the ink jet recording method. Accordingly, the above transparent protective member maybe used for any system, provided that a uniform layer having a specific absorbance distribution can be impart4ed to the color image surface. As the representative imparting system, the following two systems broadly classified are particularly important.

As the first system, there is the system in which the transparent protective member is adhered to the color image surface by pressure.

This system can easily perform lamination by merely superposing the transparent member on the color image surface and permitting them to pass through pressurizing rollers.

The second system is the same as in the above adhesion method by pressure in superposing the transparent protective member on the color image surface and permitting them to pass through pressurizing rollers, but heat is applied simultaneously while pressurization, and it is characterized by use of a hot melt type resin at the contacted surface between the transparent protective member and the color image.

The above to systems ae particularly effective in the present invention, and therefore the transparent protective member should preferably consist of the form of film or sheet so as to be convenient for these systems.

Also, for providing a single layer or a multi-layer having a specific absorbance distribution as the protective layer on the color image, the transparent protective member may sometimes take a form which can be used more effectively for the above two systems, and may also have a peelable substrate to be used in the transfer system in some cases. The transparent protective member to be used for the constitution in such a case has a transfer layer (protective layer) to be finally laminated on the color image surface and a substrate to be removed after transfer; and the transparent protective member can be formed by laminating the material for formation of the transfer layer on the so selected substrate by use of known methods such as bar coating, blade coating, reverse roll coating and gravure roll coating, etc., the substrate and the transfer layer being selected in view of, e.g., peelability between the substrate and the transfer layer and matching of the transfer layer to the surface of the color image to be protected by the transfer layer.

As the material to be used for the substrate, there may be employed, for example, paper, cloth, plastic film, etc. to the surface of which there is applied various peel-off treating agents having peeling performance such as silicone resin, or Mylar film, polypropylene film, etc.

By applying lamination treatment of the transparent protective member as described above to the image surface obtained by the recording method by use of a dye, particularly by the ink jet recording method, and further by use of a specific cyan dye as described above as the cyan ink, its lightfastness is remarkably improved other than improvements of water resistance, solvent resistance, abrasion resistance, gloss, etc. which effects could also be obtained by utilizing the laminate members of the prior art.

As the recording medium available in the present invention, there can be used as a matter of course, a large number of various ink jet recording papers proposed in the prior art or plastic sheets for OHP to effect excellent recording, or papers for copying, report papers, bond papers, slip papers, continuous slip papers, printout papers for computer, etc. widely used for business in general can be all used, and these papers may be low or highly sized.

According to the present invention, as described above, the cyan dye in the cyan ink to be used in the present invention does not promote fading of the dyes of other hues, particulary magenta and black dyes, and therefore various exellent dyes which could be used with the cyan ink with difficulty in the prior art can be used, whereby color images with extremely excellent lightfastness, etc. can be formed.

The present invention is described in more detail below by referring to Examples and Comparative examples. In the description, parts and % are based on weight, unless otherwise particularly noted.

EXAMPLES 1-6

The components shown below were thoroughly mixed with stirring and filtered through a filter made of Teflon having a mean pore size of 0.45 μm to prepare 6 sets of cyan ink, magenta ink, and black ink with their respective compositions. The dye used for the cyan ink, before formed into an ink, was subjected to sufficient purification treatment in order to remove free metal ions (metal ions not forming the metal phthalocyanine dye). Further, as the dye, there was used a dye which contained no more than 80 ppm of free metal ion content in the dye powder. As water and the organic solvent, those containing no metal ion were used.

EXAMPLE 1

Ink composition:

Dye: X parts
Polyethylene glycol (M.W. 300) 10 parts
Diethylene glycol: 15 parts
1,3-Dimethyl-2-imidazolidinone: 10 parts
Water: 65 parts Cyan ink:

0.2 part of the dye of the above formula (1-3) was used (free nickel ion in the ink=1.2 ppm);

Magenta ink:

0.5 part of the dye of the above formula (2-1) was used;

Black ink:

0.6 part of the dye of the above formula (3-1) was used.

EXAMPLE 2

Ink composition:
Dye: X parts
Diethylene glycol: 30 parts
N-methyl-2-pyrrolidone: 15 parts
Water: 55 parts Cyan ink:

B 0.5 part of the dye of the above formula (1-4) was used (free nickel ion in the ink=2.1 ppm);

Magenta ink:

0.8 part of the dye of the above formula (2-2) was used;

Black ink:

0.9 part of the dye of the above formula (3-2) was used.

EXAMPLE 3

Ink composition:

Dye: X parts
Polyethylene glycol (M.W. 600): 5 parts
Triethylene glycol: 15 parts
N-methyl-2-pyrrolidone: 10 parts
Water: 70 parts Cyan ink:

0.2 part of the dye of the above formula (1-6) was used (free nickel ion in the ink=1.0 ppm);

Magenta ink:

0.8 part of the dye of the above formula (2-3) was used;

Black ink:

0.9 part of the dye of the above formula (3-3) was used.

EXAMPLE 4

Ink composition:

Dye: X parts
Diethylene glycol: 20 parts
Polyethylene glycol (M.W. 300): 10 parts
N-methyl-2-pyrrolidone: 10 parts
Water: 60 parts Cyan ink:

0.3 part of the dye of the above formula (1-9) was used (free nickel ion in the ink=1.5 ppm);

Magenta ink:

0.6 part of the dye of the above formula (2-4) was used;

Black ink:

0.4 part of the dye of the above formula (3-4) was used.

EXAMPLE 5

Ink composition:

Dye: X parts
Polyethylene glycol (M.W. 200): 10 parts
Ethylene glycol: 20 parts
Diethylene glycol: 10 parts
Water: 60 parts Cyan ink:

0.3 part of the dye of the above formula (1-13) was used (free cobalt ion in the ink=1.7 ppm);

Magenta ink:

1.0 part of the dye of the above formula (2-5) was used;

Black ink:

0.7 part of the dye of the above formula (3-5) was used.

EXAMPLE 6

Ink composition:

Dye: X parts
Triethanolamine: 10 parts
Triethylene glycol: 10 parts
Diethylene glycol: 15 parts
Water: 65 parts Cyan ink:

0.2 part of the dye of the above formula (1-15) was used (free vanadium ion in the ink=0.9 ppm);

Magenta ink:

0.5 part of the dye of the above formula (2-6) was used;

Black ink:

0.3 part of the dye of the above formula (3-6) was used.

From the cyan inks and, the magenta inks, and the cyan inks and the black inks as described above, color charts were prepared and their lightfastness were examined. The recording medium used was IJ Mattecoat NM (produced by Mitsubishi Paper Mills, Ltd).

Color chart was formed by means of a recording device having an on-demand type multi-head (ejecting orifice diameter 35 μm, resistance value of heatgenerating resistor 50 ohm, driving voltage 30 V, frequency 2 KHz) which performs recording by generating liquid droplets by giving heat energy to the ink in the recording head.

Lightfastness test was conducted as follows. The color chart as prepared above was irradiated with xenon light by a weather-o-meter Ci-35 produced by Atlas Co. and the color difference (ΔE) before and after irradiation was measured by use of CA-35 produced by Murakami Color Research Institute. The results are shown below in Table 1.

TABLE 1

| | (Light resistance test results) | |
|---|---|---|
| Example | Cy + M | Cy + Bk |
| 1 | ⊙ | ⊙ |
| 2 | ⊙ | ⊙ |
| 3 | ⊙ | ⊙ |
| 4 | ⊙ | ⊙ |
| 5 | ○ | ○ |
| 6 | ○ | ○ |

Cy ... cyan, M ... magenta, Bk ... black
Evaluation in the above formula was conducted according to the following standards:
⊙.. ΔE ≦ 10, ○.. 10 < ΔE < 20, Δ... 20 ≦ ΔE ≦ 30, x ... 30 < ΔE

COMPARATIVE EXAMPLES 1-6

Color charts of violet color were prepared and their lightfastness tests were conducted according to the same procedure as in Example 1, except that the coordination metal of the cyan dye used in Example 1 was replaced with copper. The results are shown in Table 2.

TABLE 2

| | (Lightfastness test results) | |
|---|---|---|
| Comparative example | Cy + M | Cy + Bk |
| 1 | x | x |
| 2 | x | x |
| 3 | x | x |
| 4 | x | x |
| 5 | x | x |
| 6 | x | x |

As shown above, when copper phthalocyanine dyes were employed, remarkable fading tendency was observed.

EXAMPLES 7-10

Four kinds of cyan ink were prepared in the same manner as in Examples 1-6, and by use of the respective inks of yellow, magenta and black similarly prepared, full color images were formed according to the same ink jet system as in Examples 1-6.

For examination of the color images obtained, each color chart sample was irradiated with xenon light in Ci35 produced by Atlas Co. for 50 hours. As the result, sharpness of the color image substantially unchanged, with lowering in density being very slight.

Ink composition of Example 7

Dye: X parts
Diethylene glycol: 30 parts
N-methyl-2-pyrrolidone: 10 parts
Water: 60 parts Cyan ink 2 parts of the dye of the above formula 1-2

Magenta ink 2 parts of the dye of the above formula 2-1;

Yellow ink 2 parts of Nyrosan Yellow C-3GL (produced by Sand);

Black ink 3 parts of the dye of the above formula 3-1

Ink composition of Example 8

Dye: X parts
Diethylene glycol: 30 parts
Glycerine: 7 parts
Water: 63 parts

Cyan ink 2 parts of the dye of the above formula 1-3

Magenta ink 2 parts of the dye of the above formula 2-2;

Yellow ink 2 parts of Direct Fast Yellow-GC(produced by Hodogaya Kagaku Kogyo);

Black ink 3 parts of the dye of the above formula 3-2.

Ink composition of Example 9

Dye: X parts
Polyethylene glycol (M.W. 300): 20 parts
Ethylene glycol: 10 parts
N-methyl-2-pyrrolidone: 10 parts
Water: 60 parts Cyan ink 2 parts of the dye of the above formula 1-6

Magenta ink 2 parts of the dye of the above formula 2-3;

Yellow ink 1.5 parts of Chuganol Fast Yellow (produced by by Chugai Kasei);

Black ink 3 parts of the dye of the above formula 3-3;

Ink composition of Example 10

Dye: X parts
Triethanolamine: 10 parts
Triethylene glycol: 10 parts
Diethylene glycol: 15 parts
Water: 65 parts Cyan ink 2 parts of the dye of the above formula 1-13;

Magenta ink 2 parts of the dye of the above formula 2-5;

Yellow ink 2 parts of Supracen Yellow GR (produced by Bayer);

Black ink 3 parts of the dye of the above formula 3-4.

COMPARATIVE EXAMPLES 7–10

Inks of four primary colors were formed in the same manner as in Examples 7–10 except for using copper phthalocyanine dye in place of the cyan dyes in Examples 7–10, and full color images were formed similarly and lightfastness tests were conducted similarly. As the result, sharpness of the color image was remarkably lowered, particularly fading of the magenta color was remarkable, and the skin color portion of human image was observed to be discolored into green, with reddish color of color image being lowered as a whole.

EXAMPLE 11

By use of the four kinds of cyan ink used in the above Examples 7–10, the following tests 1–3 were conducted giving good results in all of the tests.

Test 1

Storability of ink for long term: when ink was sealed in a glass vessel and stored at −30° C. and 60° C. for 6 months, no precipitation of insoluble matter was observed and there was also no change in physical properties and tone of the solution.

Test 2

Ejecting stability: when continuous ejection was performed at room temperature of 5° C. and 40° C., respectively, recording of high quality could be performed stably from the beginning to the end.

Test 3

Ejecting response: concerning intermittent ejection at an interval of 2 seconds and ejection after standing for 2 months, ejecting response was examined, and the resulting recording was stable and uniform without clogging at the orifice tip in both cases.

COMPARATIVE EXAMPLE 11

Cyan inks were prepared according to the same method as in Example 1, except for performing particularly no purification treatment of free metals in the cyan dyes as described in Examples 7–10, and the above tests 1–3 were conducted. As the result, in test 1, precipitation of insoluble matter was observed after one month ink storage. Also, in test 2, it was frequently observed that the ink was not ejected, and the driving voltage was forced to be changed (voltage up). When the surface of the heat-generating head was observed by a microscope, brown precipitate was found to be deposited. Further, in test 3, clogging of the orifice occurred after standing for one month, whereby ejecting of ink was observed to be unstable.

The results of the above Example 11 and Comparative example 11 are shown in the following Tables.

TABLE 3

| Cyan ink | Example 11 | | | |
|---|---|---|---|---|
| | I | II1 | II2 | II3 |
| Example 7 | 1.2 | ⊙ | ⊙ | ⊙ |
| Example 8 | 0.5 | ⊙ | ⊙ | ⊙ |
| Example 9 | 0.8 | ⊙ | ○ | ⊙ |
| Example 10 | 3.0 | ○ | ○ | ○ |
| Cyan ink | Comparative example 11 | | | |
| | I | II1 | II2 | II3 |
| Example 7 | 50.3 | x | x | Δ |
| Example 8 | 23.0 | Δ | Δ | x |
| Example 9 | 86.0 | x | x | x |
| Example 10 | 35.1 | x | x | Δ |

I . . . amount of free metals (ppm)
II . . . test results (test 1-3)
⊙: very good
○: good
Δ: slightly inferior
x: inferior.

The amount of free metal ions is measured by the following procedure: the ink was diluted with water to allow its concentration to be 1/10; the solution obtained was injected, together with an eluant (10 mM oxalic acid, 7.5 mM citric acid), into a column of ion chromatography for cation analysis; and then the quantitive analysis at a wavelength of 480 nm with the use of a color forming reagent was effected.

EXAMPLES 12–17

The following inks were prepared similarly as in Example 1.

EXAMPLE 12

Ink composition:

Dye: X parts
Polyethylene glycol (M.W. 300): 10 parts
Diethylene glycol: 15 parts
1,3-dimethyl-2-imidazolidinone: 10 parts
UV-ray absorber (sodium 2-hydroxy-4-methoxybenzophenone-5-sulfonate): 2 parts
Water: 63 parts Yellow ink:

2.5 parts of C.I. Acid Yellow 23 were used as the dye;

Cyan ink:

2 parts of the dye of the above formula (1) were used as the dye (free nickel ion in the cyan ink=1.9 ppm);

Black ink:

3 parts of C.I. Direct Black 154 were used as the dye.

EXAMPLE 13

Ink composition:

Dye: X parts
Diethylene glycol: 30 parts
N-methyl-2-pyrrolidone: 20 parts
UV-ray absorber (potassium 2-hydroxy-4-methoxybenzophenone-5-sulfonate): 1.5 parts
Water: 48.5 parts Yellow ink:

2 parts of C.I. Acid Yellow 86 were used as the dye;

Magenta ink:

1.8 parts of C.I. Acid Red 32 were used the dye;

Cyan ink:

2.3 parts of the dye of the above formula (3) were used as the dye (free nickel ion in the cyan ink=0.5 ppm);

Black ink:

3.1 parts of C.I. Direct Black 19 were used as the dye.

EXAMPLE 14

Ink composition:

Dye: X parts
Triethylene glycol: 30 parts
N-methyl-2-pyrrolidone: 15 parts
UV-ray absorber (lithium 2-hydroxy-4-methoxybenzophenone-5-sulfonate): 2 parts
Water: 53 parts Yellow ink:

2.4 parts of C.I. Direct Yellow 98 were used as the dye;

Magenta ink:

2 parts of C. I. Acid Red 85 were used as the dye;

Cyan ink:

1.8 parts of the dye of the above formula (6) were used as the dye (free nickel ion in the cyan ink=0.8 ppm);

Black ink:

3.2 parts of C.I. Direct Black 17 were used as the dye.

EXAMPLE 15

Ink composition:

Dye: X parts
Polyethylene glycol (M.W. 200): 10 parts
Diethylene glycol: 20 parts
Triethanolamine: 10 parts
UV-ray absorber (sodium 2,2'-dihydroxy-4,4'-dimethoxybenzophenone-5-sulfonate: 2 parts
Water: 58 parts Yellow ink:

2 parts of C.I. Direct Yellow 26 were used as the dye;

Magenta ink:

2.1 parts of C.I. Acid Red 115 were used as the dye;

Cyan ink:

1.9 parts of the dye of the above formula (8) were used as the dye (free nickel ion in the cyan ink=2.5 ppm);

Black ink:

3.2 parts of C.I. Food Black 2 were used as the dye.

EXAMPLE 16

Ink composition:

Dye: X parts
Diethylene glycol: 30 parts
UV-ray absorber (potassium 2,2'-dihydroxy-4,4'-dimethoxybenzophenone-5-sulfonate: 2.5 parts
Water: 67.5 parts Yellow ink:

2 parts of C.I. Acid Yellow 61 were used as the dye;

Magenta ink:

2 parts of C.I. Acid Red 180 were used as the dye;

Cyan ink:

1.8 parts of the dye of the above formula (13) were used as the dye (free cobalt ion in the cyan ink=2.9 ppm);

Black ink:

3 parts of C.I. Food Black 1 were used as the dye.

EXAMPLE 17

Ink composition:

Dye: X parts
Polyethylene glycol (M.W. 300): 20 parts
N-methyl-2-pyrrolidone: 15 parts
UV-ray absorber (lithium 2,2'-dihydroxy-4,4'-dimethoxybenzophenone-5-sulfonate: 2 parts
Water: 63 parts Yellow ink:

2 parts of C.I. Acid Yellow 23 were used as the dye;

Magenta ink:

2 parts of C.I. Acid Red 37 were used as the dye;

Cyan ink:

2 parts of the dye of the above formula (14) were used as the dye (free vanadium ion in the cyan ink=1.5 ppm);

Black ink:

3.1 parts of C.I. Direct Black 32 were used as the dye;

By use of the six sets of yellow, magenta, cyan and black inks of the above Examples 12–17, full color images were formed by means of a recording device having an on-demand type multi-head (ejecting orifice diameter 35 μm, resistance value of heat-generating resistor 50 ohm, driving voltage 30 V, frequency 2 KHz) which performs recording by generating liquid droplets by giving heat energy to the ink in the recording head.

For examination of lightfastness, these images were irradiated with xenon light in a weather-o-meter Ci-35 produced by Atlas Co for 100 hrs. As the result, as is apparent from Table 4, sharpness of the full color images was found to be substantially same as the original sharpness, with lowering in density being also very slight.

TABLE 4

(Test results of lightfastness of Examples)

| Example 12 | ⊙ |
|---|---|
| Example 13 | ⊙ |
| Example 14 | ⊙ |
| Example 15 | ⊙ |
| Example 16 | ○ |
| Example 17 | ○ |

⊙: very good, ○: good, Δ: slightly inferior, x: inferior

EXAMPLES 18-23

By use of the six sets of yellow, magenta, cyan and black inks of the above Examples 1-6, full color images were formed by means of a recording device having an on-demand type multi-head (ejecting orifice diameter 35 μm, resistance value of heat-generating resistor 50 ohm, driving voltage 30 V, frequency 2 KHz) which performs recording by generating liquid droplets by giving heat energy to the ink in the recording head, and further the respective full color images were coated respectively according to the method as described below by use of the six kinds of laminate samples (a-f) as shown below in Table 5.

After a transparent paint with the composition shown below was applied by use of a bar coater to a PET (polyethyleneterephthalate) film having a thickness of 100 μm to a dry film thickness of 15 to 50 μm, the coating was dried at 70° C. to form a transfer layer on the PET film, thus giving transfer peel type protective member (A-F). Next, the full color image obtained as previously described was laminated with the above protective member (A-F) by means of a laminator (MS Lamipet L-230A, produced by Meiko Shokai) so that the transfer layer may cover the color image surface. Then, the PET film was peeled off to obtain laminate color images of Examples 18-23.

Transparent paint (composition):

Dianal LR-216 (trade name, produced by Mitsubishi Rayon, 40% toluene solution of an acrylic resin): 10 parts Tinuvin 328 (trade name, produced by Ciba-Geigy, UV-absorber): X parts

TABLE 5

| Example | I | II | III | IV |
|---|---|---|---|---|
| 18 | A | a | 1.6 | 15 |
| 19 | B | b | 1.2 | 15 |
| 20 | C | c | 1.2 | 30 |
| 21 | D | d | 1.2 | 50 |
| 22 | E | e | 1.6 | 30 |
| 23 | F | f | 3.3 | 10 |

I: protective member, II: laminate sample, III: amount of Tinuvin 328 added (parts), IV: dry film thickness (μm)

For examination of lightfastness of the laminate full color images of Examples 18-23, the images were irradiated with xenon light in a weather-o-meter Ci-35 produced by Atlas Co for 200 hrs. As the result, as is apparent from Table 6, sharpness of the full color images was found to be substantially same as the original sharpness, with lowering in density being also very slight.

TABLE 6

(Test results of light resistance of Examples)

| Example 18 (Laminate sample a) | ⊙ |
|---|---|
| Example 19 (Laminate sample b) | ⊙ |
| Example 20 (Laminate sample c) | ⊙ |
| Example 21 (Laminate sample d) | ⊙ |
| Example 22 (Laminate sample e) | ○ |
| Example 23 (Laminate sample f) | ○ |

⊙:very good, ○:good, Δ:slightly inferior, x:inferior

We claim:

1. A method for forming a color image by use of a plurality of color inks including a cyan ink, comprising the steps of forming at least a mixed color portion on a recording medium, wherein there is used an ink as the cyan ink which contains (i) 0.1-20 wt. % of a water-soluble metallophthalocyanine dye having a coordination metal selected from the group consisting of Ni, Co and V at the center of its skeleton, and which contains free ions of the metal at the concentration of 15 ppm or less, (ii) 5-95 wt. % of a water-soluble organic solvent; and (iii) 10-90 wt. % water.

2. A method according to claim 1, wherein the concentration of the free metal ions in the ink is 3 ppm or less.

3. A method according to claim 1, wherein at least a magenta ink or a black ink is used as the ink other than the cyan ink.

4. A method according to claim 4, wherein the magenta ink contains a monoazo dye.

5. A method according to claim 3, wherein the magenta ink contains a dye represented by the following formula:

$$Q_1-N=N-Q_2$$

wherein $Q_1$ represents a substituted or unsubstituted phenyl or naphthyl group and $Q_2$ represents a substituted naphthyl group.

6. A method according to claim 3, wherein the black ink contains a dye represented by the following formula:

$$Q_3-N=N-Q_4-N=N-Q_5$$

wherein $Q_3$ represents a substituted phenyl or naphthyl group, $Q_4$ represents a substituted phenylene or naphthylene group and $Q_5$ represents a substituted naphthyl group.

7. A method according to claim 1, wherein the cyan ink includes at least one phthalocyanine dye represented by the following formula:

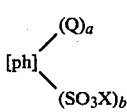

wherein [ph] represents a phthalocyanine skeleton which has a coordination metal atom selected from the group consisting of Ni, Co and V; Q represents —SO$_2$OR$_1$ or —SO$_2$NR$_2$R$_3$; X represents an alkali metal or NH$_4$; a and b independently represent an integer of 0 to 4, provided that the relationship of $2 \leq a+b \leq 4$ is satisfied; R$_1$ represents a straight or cyclic alkyl or aralkyl group which may have a branch; R$_2$ and R$_3$ independently represent a —(CH$_2$CH$_2$O)$_n$—R$_4$, —(CH$_2$CHOH)$_n$—R$_4$ group, a straight or cyclic alkyl or aralkyl group which may have a branch, or an amino acid residue; n represents an integer of 0 to 12; and R$_4$ represents H, CH$_3$, or CH$_2$OH.

8. A method according to claim 1, wherein image formation is effected according to the ink jet recording system.

9. An ink comprising a dye and a liquid medium for dissolving or dispersing the dye therein, wherein said dye is a metallophthalocyanine dye having a coordination metal selected from the group consisting of Ni, Co and V at the center of its skeleton and which contains free ions of the metal at the concentration of 15 ppm or less.

10. An ink according to claim 9, wherein the concentration of the free metal ions in the ink is 3 ppm or less.

11. An ink according to claim 9, wherein at least a magenta ink or a black ink is used as the ink other than the cyan ink.

12. An ink according to claim 11, wherein the magenta ink contains a monoazo dye.

13. An ink according to claim 11, wherein the magenta ink contains a dye represented by the following formula:

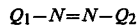

wherein Q$_1$ represents a substituted or unsubstituted phenyl or naphthyl group and Q$_2$ represents a substituted naphthyl group.

14. An ink according to claim 11, wherein the black ink contains a dye represented by the following formula:

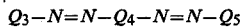

wherein Q$_3$ represents a substituted phenyl or naphthyl group, Q$_4$ represents a substituted phenylene or naphthylene group and Q$_5$ represents a substituted naphthyl group.

15. An ink according to claim 9, wherein the ink is an aqueous ink.

16. An ink according to claim 9, wherein said phthalocyanine dye includes at least one phthalocyanine dye represented by the following formula:

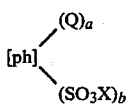

where [ph] represents a phthalocyanine skeleton which has a coordination metal atom selected from the group consisting of Ni, Co and V; Q represents —SO$_2$OR$_1$ or —SO$_2$NR$_2$R$_3$; X represents an alkali metal or NH$_4$; a and b independently represent an integer of 0 to 4, provided that the relationship of 2≦a+b≦4 is satisfied; R$_1$ represents a straight or cyclic alkyl or aralkyl group which may have a branch; R$_2$ and R$_3$ independently represent a —(CH$_2$CH$_2$O)$_n$—R$_4$, —(CH$_2$CHOH)$_n$—R$_4$ or —(CHCH$_3$CH$_2$O)$_n$—R$_4$ group, a straight or cyclic alkyl or aralkyl group which may have a branch, or an amino acid residue; n represents an integer of 0 to 12; and R$_4$ represents H, CH$_3$, or CH$_2$OH.

17. An ink according to claim 9, wherein the content of said dye is within the range of from 0.1 to 20 wt.% of the total ink weight.

18. A method for forming a color image by use of a plurality of color inks including a cyan ink, comprising forming at least a mixed color portion on a recording medium, wherein at least one of the color inks contains a UV-ray absorber and there is used an ink as the cyan ink which contains (i) 0.1–20 wt.% of a water-soluble metallophthalocyanine dye having a coordination metal selected from the group consisting of Ni, Co and V at the center of its skeleton which contains free ions of the metal at the concentration of 15 ppm or less; (ii) 5–95 wt.% of a water-soluble organic solvent; and (iii) 10–90 wt.% water.

19. A method according to claim 18, wherein the concentration of the free metal ions in the ink is 3 ppm or less.

20. A method according to claim 18, wherein at least a magenta ink or a black ink is used as the ink other than the cyan ink.

21. A method according to claim 20, wherein the magenta ink contains a monoazo dye.

22. A method according to claim 20, wherein the magenta ink contains a dye represented by the following formula:

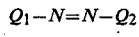

wherein Q$_1$ represents a substituted or unsubstituted phenyl or naphthyl group and Q$_2$ represents a substituted naphthyl group.

23. A method according to claim 20, wherein the black ink contains a dye represented by the following formula:

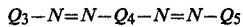

wherein Q$_3$ represents a substituted phenyl or naphthyl group, Q$_4$ represents a substituted phenylene or naphthylene group and Q$_5$ represents a substituted naphthyl group.

24. A method according to claim 18, wherein the cyan ink includes at least one phthalocyanine dye represented by the following formula:

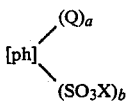

wherein [ph] represents a phthalocyanine skeleton which has a coordination metal atom selected from the group consisting of Ni, Co and V; Q represents —SO$_2$OR$_1$ or —SO$_2$NR$_2$R$_3$; X represents an alkali metal or NH$_4$; a and b independently represent an integer of 0 to 4, provided that the relationship of 2≦a+b≦4 is satisfied; R$_1$ represents a straight or cyclic alkyl or aralkyl group which may have a branch; R$_2$ and R$_3$ independently represent a —(CH$_2$CH$_2$O)$_n$—R$_4$, —(CH$_2$CHOH)$_n$—R$_4$ group, a straight or cyclic alkyl or aralkyl group which may have a branch, or an amino acid residue; n represents an integer of 0 to 12; and R$_4$ represents H, CH$_3$, or CH$_2$OH.

25. A method according to claim 18, wherein said UV-ray absorber is soluble in the ink medium.

26. A method according to claim 18, wherein the content of said UV-ray absorber is within the range of from 0.1 to 5 wt.% of the total ink weight.

27. A method for forming a color image by use of a plurality of color inks including a cyan ink, comprising the steps of forming at least a mixed color portion on a recording medium, wherein the color image is coated with a transparent protective member containing at least a UV-ray absorber and there is used an ink as the cyan ink which contains (i) 0.1-20 wt.% of a water-soluble metallophthalocyanine dye having a coordination metal selected from the group consisting of Ni, Co and V at the center of its skeleton and which contains free ions of the metal at the concentration of 15 ppm or less; (ii) 5-95 wt.% of a water-soluble organic solvent; and (iii) 10-90 wt.% water.

28. A method according to claim 27, wherein the concentration of the free metal ions in the ink is 3 ppm or less.

29. A method according to claim 27, wherein at least a magenta ink or a black ink is used as the ink other than the cyan ink.

30. A method according to claim 29, wherein the magenta ink contains a monoazo dye.

31. A method according to claim 29, wherein the magenta ink contains a dye represented by the following formula:

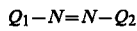

where $Q_1$ represents a substituted or unsubstituted phenyl or naphthyl group and $Q_2$ represents a substituted naphthyl group.

32. A method according to claim 29, wherein the black ink contains a dye represented by the following formula:

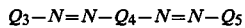

wherein $Q_3$ represents a substituted phenyl or naphthyl group, $Q_4$ represents a substituted phenylene or naphthylene group and $Q_5$ represents a substituted naphthyl group.

33. A method according to claim 29, wherein the cyan ink includes at least one phthalocyanine dye represented by the following formula:

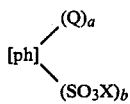

wherein [ph] represents a phthalocyanine skeleton which has a coordination metal atom selected from the group consisting of Ni, Co and V; Q represents $-SO_2OR_1$ or $-SO_2NR_2R_3$; X represents an alkali metal or $NH_4$; a and b independently represent an integer of 0 to 4, provided that the relationship of $2 \leq a+b \leq 4$ is satisfied; $R_1$ represents a straight or cyclic alkyl or aralkyl group which may have a branch; $R_2$ and $R_3$ independently represent a $-(CH_2CH_2O)_n-R_4$, $-(CH_2CHOH)_n-R_4$ or $-(CHCH_3CH_2O)_n-R_4$ group, a straight or cyclic alkyl or aralkyl group which may have a branch, or an amino acid residue; n represents an integer of 0 to 12; and $R_4$ represents H, $CH_3$, or $CH_2OH$.

34. A method according to claim 1, wherein said color image is formed using an ink-jet recording system wherein droplets of recording liquid are ejected from a fine opening by the application of heat energy.

35. A method according to claim 18, wherein said color image is formed using an ink-jet recording system wherein droplets of recording liquid are ejected from a fine opening by the application of heat energy.

36. A method according to claim 27, wherein said color image is formed using an ink-jet recording system wherein droplets of recording liquid are ejected from a fine opening by the application of heat energy.

37. A method according to claim 1, wherein said recording medium is a coated paper.

38. A method according to claim 18, wherein said recording medium is a coated paper.

39. A method according to claim 27, wherein said recording medium is a coated paper.

* * * * *

UNITED STATES PATENT AND TRADEMARK OFFICE
CERTIFICATE OF CORRECTION

PATENT NO. : 4,864,324

DATED : September 5, 1989

INVENTOR(S) : Shirota, et al.

It is certified that error appears in the above-identified patent and that said Letters Patent is hereby corrected as shown below:

TITLE PAGE

[30] Foreign Application Priority Data:

"Sep. 17, 1986 [JP]   Japan............61-217266"
should read
--Sep. 17, 1986 [JP]   Japan............61-217226--.

[57] ABSTRACT:

Line 7, "methallophthalocyanine" should read
--metallophthalocyanine--.

COLUMN 1:

Line 9, "forming," should read --forming--.

Line 36, "characteristics" should read --characteristic--.

Line 38, "about" should be deleted.

Line 45, "of" should read --having--, and "having" should read --of--.

Line 57, "most" should be deleted, and "partic-" should read --most partic- --.

UNITED STATES PATENT AND TRADEMARK OFFICE
CERTIFICATE OF CORRECTION

PATENT NO. : 4,864,324

DATED : September 5, 1989

INVENTOR(S) : Shirota, et al.

It is certified that error appears in the above-identified patent and that said Letters Patent is hereby corrected as shown below:

COLUMN 3:

Line 20, "groups II, IV, VII and VIII" should read --groups IIA, IVB, VA, VIIA AND VIII of the periodic Table of the Elements--.

Line 48, "in" should be deleted.

COLUMN 4:

Line 38, "abranching;" should read --branching;--.

COLUMN 5:

Line 32, "phthalocyaine" should read --phthalocyanine--.

Line 45, "a" should be deleted.

Line 57, "images." should read --image.--.

Line 67, "before" should read --is purified before--.

Line 68, "is" should be deleted--.

COLUMN 6:

Line 1, "or" should read --during or--.

UNITED STATES PATENT AND TRADEMARK OFFICE
CERTIFICATE OF CORRECTION

PATENT NO. : 4,864,324

DATED : September 5, 1989

INVENTOR(S) : Shirota, et al.

It is certified that error appears in the above-identified patent and that said Letters Patent is hereby corrected as shown below:

COLUMN 8:

Line 21, "is" should read --are--.

COLUMN 10:

Line 62, "UV-wavelength" should read --the UV-wavelength--.

COLUMN 11:

Line 14, "(2'L-hydroxy-" should read --(2'-hydroxy- -- (do not bold print).

COLUMN 12:

Line 47, "UV-wavelength" should be deleted.

UNITED STATES PATENT AND TRADEMARK OFFICE
CERTIFICATE OF CORRECTION

PATENT NO. : 4,864,324

DATED : September 5, 1989

INVENTOR(S) : Shirota, et al.

It is certified that error appears in the above-identified patent and that said Letters Patent is hereby corrected as shown below:

COLUMN 13:

Line 2, "droxybenzophenon" should read --droxybenzophenone--.

Line 3, "5-'di" should read --5'-di--.

Line 26, "derivative" should read --derivatives--.

Line 49, "and" should be deleted.

Line 50, "coloraton" should read --coloration--.

Line 54, "he" should read --the--.

COLUMN 14:

Line 4, "of" should be deleted.

Line 15, "maybe" should read --may be--.

Line 18, "part4ed" should read --parted--.

Line 36, "to systems ae" should read --two systems are--.

COLUMN 15:

Line 19, "particulary" should read --particularly--.

UNITED STATES PATENT AND TRADEMARK OFFICE
CERTIFICATE OF CORRECTION

PATENT NO. : 4,864,324

DATED : September 5, 1989

INVENTOR(S) : Shirota, et al.

It is certified that error appears in the above-identified patent and that said Letters Patent is hereby corrected as shown below:

COLUMN 16:

Line 4, "B 0.5 part" should read --0.5 part--.

COLUMN 17:

Line 37, "heatgenerat-" should read --heat generat- --.

COLUMN 18:

Line 27, "substantially" should read --is substantially--.

COLUMN 19:

Line 16, "by" (first occurrence) should be deleted.

Line 20, "formula 3-3;" should read --formula 3-3.--.

COLUMN 21:

Line 26, "used" should read --used as--.

COLUMN 22:

Line 60, "dye;" should read --dye.--.

UNITED STATES PATENT AND TRADEMARK OFFICE
CERTIFICATE OF CORRECTION

PATENT NO. : 4,864,324

DATED : September 5, 1989

INVENTOR(S) : Shirota, et al.

It is certified that error appears in the above-identified patent and that said Letters Patent is hereby corrected as shown below:

COLUMN 23:

Lines 3 and 66, "Co" should read --Co.--.

Line 48, "10" should read --100--.

COLUMN 24:

Line 31, "claim 4," should read --claim 3,--.

Signed and Sealed this

Twenty-ninth Day of October, 1991

*Attest:*

HARRY F. MANBECK, JR.

*Attesting Officer*    *Commissioner of Patents and Trademarks*